(12) United States Patent
Baughman et al.

(10) Patent No.: US 10,888,777 B2
(45) Date of Patent: Jan. 12, 2021

(54) DEEP LEARNING FROM REAL WORLD AND DIGITAL EXEMPLARS

(71) Applicant: International Business Machines Corporation, Armonk, NY (US)

(72) Inventors: Aaron K. Baughman, Silver Spring, MD (US); Venkatesh A. R. Rao, Natick, MA (US); Mary E. Rudden, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 16/148,061

(22) Filed: Oct. 1, 2018

(65) Prior Publication Data
US 2020/0101375 A1 Apr. 2, 2020

(51) Int. Cl.
| | | |
|---|---|---|
| A63F 13/25 | (2014.01) | |
| G06N 3/08 | (2006.01) | |
| G06N 3/04 | (2006.01) | |
| G06T 11/00 | (2006.01) | |
| G06T 9/00 | (2006.01) | |
| G06K 9/62 | (2006.01) | |

(52) U.S. Cl.
CPC .............. *A63F 13/25* (2014.09); *G06N 3/04* (2013.01); *G06N 3/084* (2013.01); *A63F 2300/8082* (2013.01); *G06K 9/6257* (2013.01); *G06T 9/002* (2013.01); *G06T 11/00* (2013.01); *G06T 2210/44* (2013.01)

(58) Field of Classification Search
CPC ........... A63F 13/25; G06N 3/04; G06N 3/084
See application file for complete search history.

(56) References Cited

U.S. PATENT DOCUMENTS

| | | | |
|---|---|---|---|
| 8,161,397 B2 | 4/2012 | Kalasapur et al. | |
| 8,386,918 B2 | 2/2013 | Do et al. | |
| 8,754,886 B2 | 6/2014 | Wouhaybi et al. | |
| 9,728,010 B2 | 8/2017 | Thomas et al. | |
| 2009/0066690 A1* | 3/2009 | Harrison | G06T 19/006 345/419 |
| 2009/0171901 A1* | 7/2009 | Bathiche | G06F 16/24573 |
| 2010/0161413 A1 | 6/2010 | Amsterdam et al. | |

(Continued)

OTHER PUBLICATIONS

Anonymous, "A method of mapping real world environments to a virtual world," IP.com Disclosure No. IPCOM000244981D, Publication Date: Feb. 4, 2016, 3 pages.

(Continued)

*Primary Examiner* — David L Lewis
*Assistant Examiner* — Shauna-Kay Hall
(74) *Attorney, Agent, or Firm* — Schmeiser, Olsen & Watts, LLP; Brian Restauro

(57) ABSTRACT

A method of deep learning from real world and digital exemplars includes determining, by one or more processors of a computer system, a style component of a digital environment of a game platform, combining, by the one or more processors of the computer system, the style component with content derived from a real world exemplar, morphing, by one or more processors of a computer system, the real world exemplar to an augmented digital exemplar of the game platform, and adapting, by the one or more processors of the computer system, at least one deep learning algorithm to accomplish at least one of the determining, combining and morphing.

20 Claims, 9 Drawing Sheets

(56) References Cited

U.S. PATENT DOCUMENTS

| | | | |
|---|---|---|---|
| 2010/0277468 A1* | 11/2010 | Lefevre | G06T 15/00 345/419 |
| 2011/0316845 A1* | 12/2011 | Roberts | G06T 19/006 345/419 |
| 2013/0079128 A1 | 3/2013 | Thomas et al. | |
| 2013/0225260 A1* | 8/2013 | Cudak | A63F 13/12 463/23 |
| 2017/0236332 A1* | 8/2017 | Kipman | G02B 27/0172 345/633 |
| 2019/0139308 A1* | 5/2019 | Sun | G06T 19/006 |
| 2019/0270015 A1* | 9/2019 | Li | A63F 13/65 |

OTHER PUBLICATIONS

Tulchinsky et al., "Real-world Products in Virtual Environments," IP.com Disclosure No. IPCOM000229273D, Publication Date: Jul. 17, 2013, 18 pages.

* cited by examiner

DEEP LEARNING FROM REAL WORLD AND DIGITAL EXEMPLARS

TECHNICAL FIELD

The present invention relates to deep learning and artificial intelligence. More specifically, the invention relates to systems and methods for deep learning from real world and virtual exemplars on gaming platforms.

BACKGROUND

Digital, virtual or virtual reality gaming is a growing industry that has become popular with people of all ages. Various platforms exist in which games are played. Game makers utilize various game making tools, engines or platforms in order to make games. Many games and/or developmental engines or platforms for games include the possibility of allowing gameplay to occur in various environments that virtually exist within the game. These game environments add variation to the game and might impact styles of play for players. For example, a player may be teleported between various environments, arenas, lighting and stages which change the style of play in the game. In other instances, these game environments may be aesthetic. Games and/or developmental engines or platforms must be capable of providing a variety of possible environments during gameplay.

SUMMARY

An embodiment of the present invention relates to a method, and associated computer system and computer program product, for deep learning from real world and digital exemplars. One or more processors of a computing system determining a style component of a digital environment of a game platform. The one or more processors of the computer system combine the style component with content derived from a real world exemplar. The one or more processors of the computer system morph the real world exemplar to an augmented digital exemplar of the game platform. The one or more processors of the computer system adapt at least one deep learning algorithm to accomplish at least one of the determining, combining and morphing.

DETAILED DESCRIPTION

Figure 1:
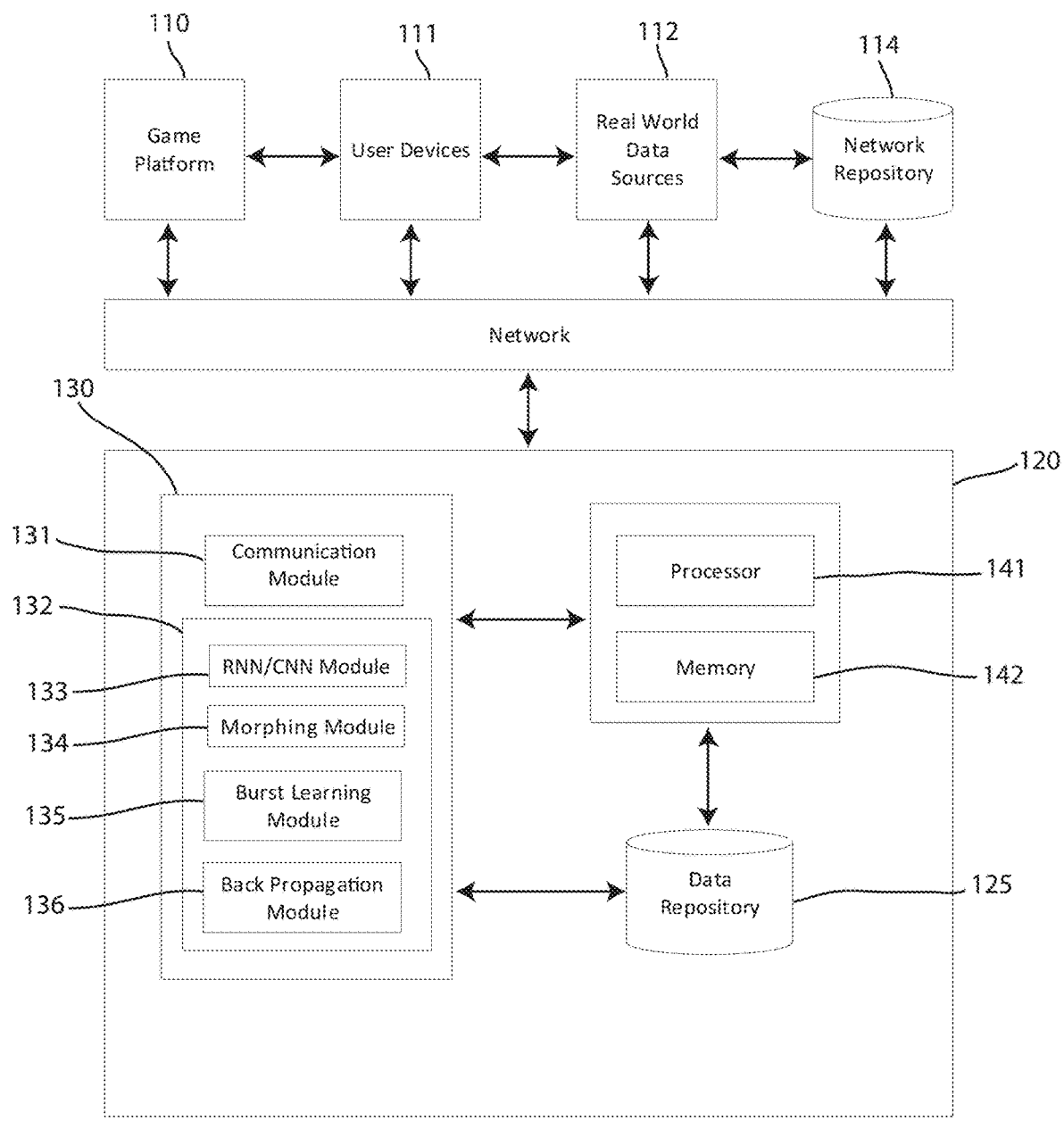
FIG. 1 depicts a block diagram of a system for deep learning from real world and digital exemplars, in accordance with embodiments of the present invention.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention provides a mechanism to create environmental components or portions of a digital environment, i.e. digital exemplars, based on environmental components found in the real world, i.e. real world exemplars. Hereinafter "exemplar" means one or more aspects of an environment, which may include a model, texture, an effect, a style, a doodad, lighting, weather, terrain, landscapes, buildings, built elements, moving objects, people, sound, smell, or any other environmental effect which may be sensed and which may be converted into a digital or virtual impact within a game.

By augmenting digital exemplars based directly upon a real world exemplar, a game, or a game development engine or platform, may utilize the present invention to automatically incorporate aspects of a real world environment into a digital gaming environment. In particular, a game, or a game development engine or platform, may provide a digital gaming environment which corresponds to a real world environment in some manner. Further, a game developer a game, or a game development engine or platform, may provide a digital gaming environment which automatically changes, updates, moves or the like, in real time, based on corresponding changes, updates or movements in the real world.

The present invention further provides for deep learning through recurrent neural networks (RNNs) and convolutional neural networks (CNNs) is capable of learning the style components of digital environments so that the augmentation of purely digital exemplars with real world exemplars may be performed and adapted automatically and quickly. Further, the present invention allows for very fast augmentation with augmented digital exemplars in instances of rapidly changing gaming environments. Embodiments of the present invention improve the technological field of augmented reality by dynamically provisioning augmented digital exemplars in rapidly changing environments.

The present invention incorporates real world data sources or sensors such as cameras, temperatures sensors, light sensors, speed sensors, location sensors, attendance sensors, or the like, and processes sensed information to augment digitally created worlds. The present invention provides such augmentation automatically and without human intervention. The present systems described herein are configured to utilize real world exemplars sensed or compiled by these real world data sources in order to provide digital or virtual world augmentation. The present invention may include further include specialized hardware such as virtual reality sensors, game controllers, or the like, which may be utilized by systems described herein to interact with augmented digital exemplars.

Referring to the drawings, FIG. 1 depicts a block diagram of a system for deep learning from real world and digital exemplars 100, in accordance with embodiments of the present invention. Embodiments of the system for deep learning from real world and digital exemplars 100 may be configured to morph real world exemplars into generated digital, virtual and/or gaming exemplars. Embodiments of the system for deep learning from real world and digital exemplars 100 may be configured to learn styles of digital environments, game platforms and/or e-sports to increase the speed in which augmented digital exemplars may be rendered or provided to a digital environment. Embodiments of the system for deep learning from real world and digital exemplars 100 may be configured to "boost" the speed in which augmented digital exemplars may be rendered or otherwise provided to a digital environment based on a learned analysis of pure digital exemplars and a real world exemplar. Embodiments of the system for deep learning from real world and digital exemplars 100 may be configured to provide for adaptive gaming styles, exemplars or models based on game changes happening in real time. Further, embodiments of the system for deep learning from real world and digital exemplars 100 may be configured to learn based on teleportation or movement between digital environments visited by players in a gaming platform. Thus, embodiments of the system for deep learning from real world and digital exemplars 100 may be configured to enable the use of real world exemplars, styles or models with purely digital exemplars, styles or models to quickly adapt deep learning algorithms to augment new digital or virtual environments with augmented digital exemplars.

The system for deep learning from real world and digital exemplars 100 may include a game platform 110, user devices 111, real world data sources 112, and at least one network repository 114 connected over a network 107 to a computer system 120. The computer system 120 includes a module block 130 that contains various modules for performing much of the functionality described herein. The network 107 may be configured to provide output information from the module block 130 and computer system 120 to the user devices 111 and/or game platform 110. However, in other embodiments (described herein below and shown in FIG. 2), the module block 130 and accompanying modules described herein may be provided directly within the gaming platform 110 which may communicate directly with the user devices 111.

The game platform 110 may be a computer game platform, a video game platform or a game engine platform for creating games, such as the Unity® game engine. The game platform 110 may include or provide for multi-player usage that connects a plurality of users to play a game simultaneously cooperatively and/or competitively. It is contemplated that the game platform 10 may be capable of generating, creating or otherwise providing a game that is played on a personal computer operating system such as windows, or a game that is played on a gaming system or platform that is connected to a display screen. The game platform 110 may be capable of generating, creating or otherwise providing a game that is played on a mobile device that is, for example, downloadable in an application store or interface on a mobile device such as a mobile phone or tablet. Alternatively, the game platform 110 may be a gaming, social networking, digital distribution and/or digital rights management platform or interface. The game platform 110 may be capable of generating, creating or otherwise providing a virtual reality (VR) game or a classic game that is displayed on a pixelated display. The game platform 110 may be a gaming broadcast or streaming platform or the like, or streaming channels thereof.

A user devices 111 may be any device operated by a user, gamer, e-sport athlete, or the like. For example, the user device 111 may be a desktop computer, laptop computer, mobile phone, tablet, or the like. Further, the user devices 111 may include various input devices that are used by the user of a game to provide commands that are interpreted by the game. For example, the user devices 111 may include a keyboard, a mouse, a handheld controller, a virtual input device such as one or more motion sensors, sound sensors, or the like. User devices 111 may still further include display devices such as one or more display screens, televisions, monitors, a VR headset, or the like. User devices 111 may further include sound producing devices such as one or more speakers, subwoofers, or the like. User devices 111 may include one or a combination of the above described devices either separately connected or integrally included or otherwise incorporated in a single unit.

The real world data sources 112 may include one or more environmental sensors. An environmental sensor provided herein may be an image capture device, a temperature sensor, a rain sensor, a light sensor, an attendance counter, a speedometer, a GPS sensor, a gyroscope, a location sensor, or the like. Any sensor configured to provide information about the real world to the computer system 120 is contemplated. Real world data sources 112 may include other sources of information or data available publicly and/or may be found or otherwise procured from internet sources such as traffic data, air traffic data, weather data, or the like. Real world data sources 112 may further include data collected by user internet use on content providers such as social networks. Real world data sources 112 may still further include public images or written articles published on the internet. Real world data sources 112 may include any information or data that relates or corresponds to an aspect of the real world which may be updated over time as the aspect changes.

The network repository 114 may be a data collection area on the network 107 which may back up and save all the data transmitted back and forth between the nodes of the network 107. For example, the network repository 114 may be a data center saving and cataloging user data sent by the user devices 111, game platform 110, real world data sources 112, or the like. The network repository 114 may use this data to generate databases related to the information received. In some embodiments, a data collection center housing the network repository 114 may include an analytic module capable of analyzing each piece of data being stored by the network repository 114. Further, the computer system 120 may be integrated with or may be a component of the data collection center housing the network repository 114. In some alternative embodiments, the network repository 114 may be a local repository that is connected to the computer system 120.

The network 107 may be any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture. The computer system 120 is shown connected to the game platforms 110, user devices 111 real world data sources 112, content sources 114 and one or more network repositories 115 via the network 107.

Embodiments of the computer system 120 may include the module block 130. The module block 130 may include a communication module 131 and an analytics module 132. The analytics module 132 may include a recurrent neural network (RNN) and/or convolution neural network (CNN) module 133, a morphing module 134, a burst learning module 135, and a back propagation module 136. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the communication module 131 may include one or more components of hardware and/or software program code for obtaining, retrieving, collecting, or otherwise receiving information from the game platform 110, the user devices 111, the real world data sources 112, and/or the network repository 114. In an exemplary embodiment, the communication module 131 may be configured to receive information and provide the information to the data repository 125 of the computer system 120. Alternatively, the communication module 131 may be configured to provide received information directly to the analytics module 132 for analysis, learning or the like.

Referring still to FIG. 1, embodiments of the computer system 120 may further include an analytics module 132. Embodiments of the analytics module 132 may include one or more components of hardware and/or software program code for analyzing information received by the communication module 131 or stored in the data repository 125. The analytics module 132 may be configured to analyze information in real time as the information is received by the communication module 131. The analytics module 132 may be deep learning or artificial intelligence module configured to analyze received information and use this information to better predict possible future outcomes. The analytics module 132 is shown encompass multiple sub modules—the RNN and/or CNN module 133, the morphing module 134, the burst learning module 135, and the back propagation module 136, each of which described herein below. Using the modules 133, 134, 135 and 136, the analytics module 132 may be configured to utilize data received by the computer system from the real world data sources and perform the methods described herein.

Embodiments of the RNN and/or CNN module 133 may include one or more components of hardware and/or software program code for encoding inputted exemplars and/or generating vectors from inputted exemplars. The RNN and/or CNN module 133 may include one or more RNNs. An RNN may be any recurrent neural network capable of recognizing patterns over time. An RNN may be utilized for recognition of previously processed information or exemplars and learning from the processing of information or exemplars. The RNN and/or CNN module 133 may include one or more CNNs. A CNN may be any convoluted neural network utilized for recognizing patterns across space. Like the RNN's, a CNN may be utilized for recognition of previously processed information or exemplars and learning from the processing of information or exemplars. In one embodiment, the information received by the computer system 120 may be first processed by an RNN and then fed from the RNN to a CNN. The RNN may be configured to learn processed information over time, while the CNN is processing, recognizing or differentiating objects in space.

For example, a first RNN and CNN combination may be provided for processing, recognizing and/or learning features of real world exemplars, such as digital images. The first RNN and CNN combination may be configured to recognize previously processed real world exemplars. A second RNN and CNN combination may be provided for processing, recognizing and/or learning features of purely digital exemplars. The second RNN and CNN combination may be configured to recognize previously processed purely digital exemplars. A third RNN and CNN combination may be provided for processing, recognizing and/or learning style components or features of digital environmental within a game platform. The third RNN and CNN combination may be configured to recognize previously processed environmental styles. A fourth RNN and CNN combination may be provided for processing, recognizing and/or learning features of augmented digital exemplars that are created with the morphing module 134 described herein. The fourth RNN and CNN combination may be configured to recognize previously processed augmented digital exemplars created by the morphing module 134.

The RNN and/or CNN module 133 may further include a frame grabber sub module configured to grab images from the gaming platform while the game platform is hosting a game in which the digital environmental, items or other pure digital exemplars may be recognized. For example, the frame grabber may be configured to acquire images of environments rendered in the game immediately as a new environment is introduced. The frame grabber may be configured to retrieve frames only at the time a new environment is introduced, or may be configured to retrieve frames at regular or predetermined intervals, or upon particular events related to the environment occur within the game. Whatever the embodiment, the frame grabber may provide exemplar information to the RNNs and CNNs of the RNN and/or CNN module 133.

With continued reference to FIG. 1, the analytics module 132 may include a morphing module 134. Embodiments of the morphing module 134 may include one or more components of hardware and/or software program code for morphing a real world exemplar to an augmented digital exemplar of the game platform. Embodiments contemplated include the morphing module 134 being configured to perform morphing of the real world exemplar and a digital environmental style from the game platform into the augmented digital exemplar for the gaming platform. The morphing module 134 may be configured to receive a decoded style vector from the RNN and/or CNN module 133 relative to an environmental exemplar. Likewise, the morphing module 134 may be configured to receive a decoded content vector from the RNN and/or CNN module 133 relative to a real world exemplar. The morphing module 134 may be configured to analyze each of these vectors and generate the augmented digital exemplar which relates or corresponds to the real world exemplar.

For example, the morphing module 134 may receive real world data relative to the weather in the real world at a location being cloudy with heavy rain. The real world data may be provided in the form of an image, which may be analyzed by the RNN and/or CNN module 133 and exported to the morphing module 134 as a content exemplar related to the weather condition. Similarly, the RNN and/or CNN module 133 may analyze the gaming environment, and determine that the environment is outside, and includes an open sky. A style vector related to this determination may be provided by the RNN and/or CNN module 133 to the morphing module 134. The morphing module 134 may take the real world content vector and the digital environment style vector and create a morphed augmented digital exemplar that includes features or styles of a dark and cloudy sky. Thus, the sky in the game environment may depend on the sky in the real world. As the sky in the real world changes and becomes clear and sunny, the RNN and/or CNN module 133 may receive new real world data or information from the communication module 131 and recognize the change to create a new content vector, which may be provided to the morphing module 134. Thus, an augmented digital exemplar of a clear sky may be provided by the morphing module 134 within the digital or virtual environment.

The morphing module 134 may be configured to morph various real world exemplars into augmented digital exemplars in the above described manner. For example, the augmented digital exemplar may be the color of trees in a digital or virtual environment. The augmented digital exemplar may be adding a blur or movement indicator to the digital or virtual environment if the received real world exemplar relates to, for example, the user in the real world moving at a fast rate in a vehicle. In the case that a user is playing a virtual reality game, it may be that the real world exemplar is data indicating that the person is standing, sitting, or walking. A recognition of this by the RNN and/or CNN module may produce augmented digital exemplars in a digital or virtual environment by the morphing module 134. The real world exemplar may further be the loudness of an environment, the colors in the real world environment, the number of fans attending an event in a real world stadium, the score of a real world athletic event, or the like. Anything occurring in the real world, to which data exists to be recognized by the RNN and/or CNN module, may be configured to produce an augmented digital exemplar from the morphing module 134.

With continued reference to FIG. 1, the analytics module 132 may include a burst learning module 135. Embodiments of the burst learning module 135 may include one or more components of hardware and/or software program code for increasing the speed in which augmented digital exemplars are capable of being rendered in a digital or virtual environment. The burst learning module 135 may be configured to learn when an augmented digital exemplar has been created by the morphing module 134 and recognize when a digital exemplar rendered within a game environment is a pure digital exemplar or an augmented digital exemplar. The burst learning module 135 may be configured to receive an image of each augmented digital exemplar created by the morphing module 134 for the purposes of training and analysis. The burst learning module 135 may be configured to store a label for each of these augmented digital exemplars, such that future renderings can be provided very quickly in real time as a user moves from one environment to another within a game, through movement, teleportation or the like. By learning which real world exemplars correspond to augmented digital exemplars, the burst learning module 135 may be configured to provide many augmented digital exemplars to a digital environment very quickly.

With continued reference to FIG. 1, embodiments of the computer system 120 may include a back propagation module 136. Embodiments of the back propagation module 136 may include one or more components of hardware and/or software program code for multiplying the amount of augmented digital exemplars that are provided or rendered to a digital environment to increase the speed in which the digital environment is rendered to a user. The back propagation module 136 may be configured to create a boosted burst model that allows for the increase of the number of augmented digital exemplars being produced by 10 times, 50 times or the like, in instances where such boosting is appropriate. For example, if the augmented digital exemplar is a color change of leaves on a tree, the back propagation module 136 may recognize that the creation of one augmented digital exemplar leaf by the morphing module 134 may be boosted 50 or more times to render many leaves on one or more trees in the digital or virtual environment. The back propagation module 136 may determine the difference between real world encodings or vectors, purely digital encodings or vectors, and augmented digital exemplars and determines a boost factor for the augmented digital exemplar. The boost factor may relate to the log of the Cartesian distance between each of the real world encodings or vectors, purely digital encodings or vectors, and augmented digital exemplar within the digital environment. The back propagation module 136 may be configured to work with the burst learning module 135 to combine a burst model generated from the augmented digital exemplar with a boosted burst model generated from the back propagation module 136 to create a combined adaptable model for rendering or otherwise providing a fully rendered augmented environment based on real world exemplars in real time, and in situations where a player is quickly changing environments through movement or teleportation.

While the above described modules 131, 132, 133, 134, 135, 136 within the module block 130 have been described as separate components of the computer system 120, the modules 131, 132, 133, 134, 135, 136 may be a single combined computer program. While some of the modules 131, 132, 133, 134, 135, 136 may be separate, others may be combined or overlap in functionality with each other.

Referring still to FIG. 1, embodiments of the computer system 120 may be equipped with a memory device 142 which may store the information related to the game platform 110 and/or the user devices 111 thereof. The computer system 120 may further be equipped with a processor 141 for implementing the tasks associated with the system for predicting future performance of a digital exemplars system 100.

Figure 2:
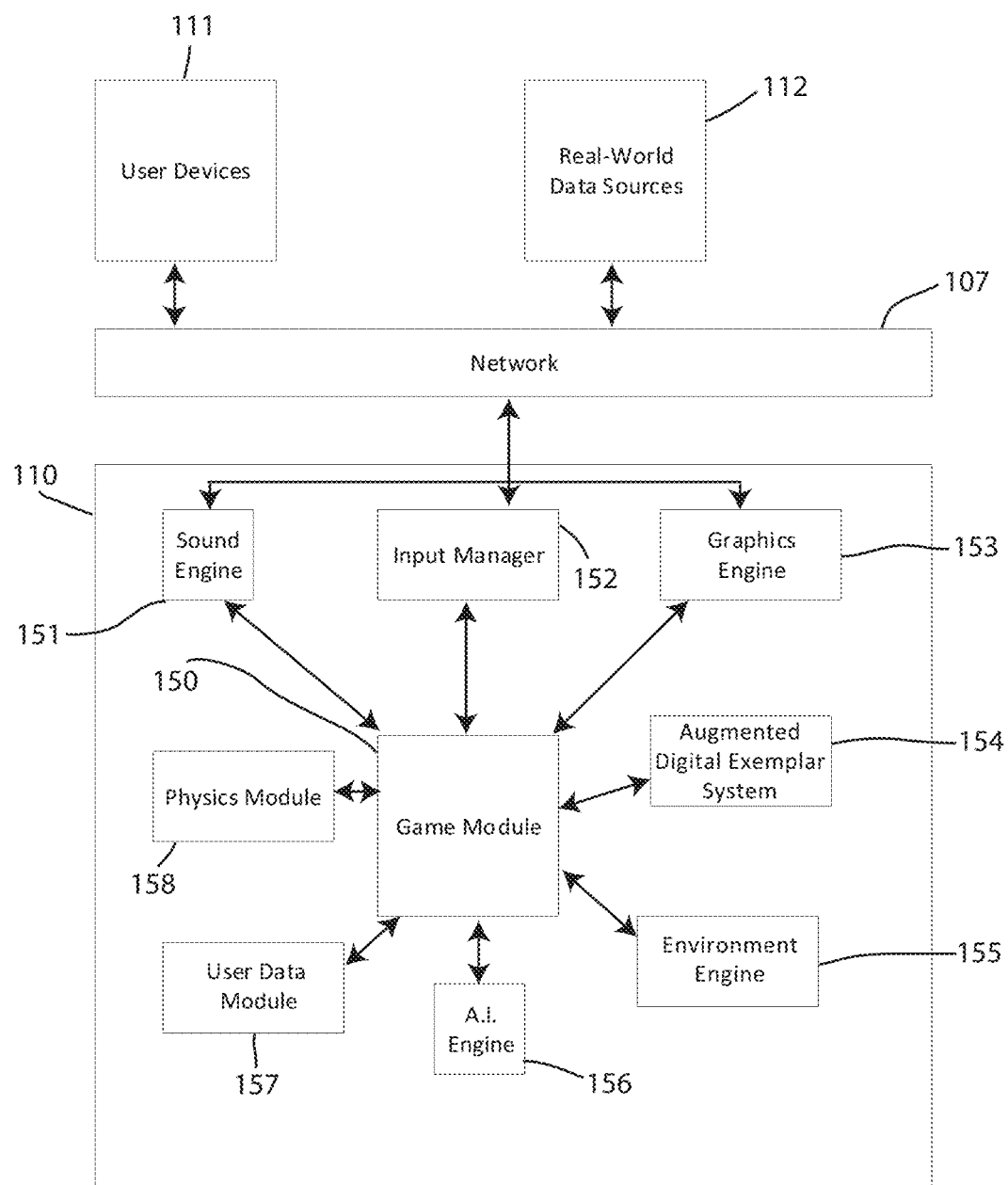
FIG. 2 depicts a block diagram of a gaming platform, in accordance with embodiments of the present invention.

FIG. 2 depicts a block diagram of the gaming platform 110 of FIG. 1, in accordance with embodiments of the present invention. As shown, the gaming platform 110 may be connected to the user devices 111 and the real-world data sources 112 over the network 107. Alternatively, the game platform 110 may be directly connected to the user devices 111 and the real-world data sources 112. As described above, the gaming platform 110 may be a game development engine or tool, or may be an already developed game.

The gaming platform 110 is shown including a game module 150 connected to a sound engine 151, an input manager 152, a graphics engine 153, an augmented digital exemplar system 154, an environment engine 155, an A.I. engine 156, a user data module 157 and a physics engine 158. The gaming platform 110 is not limited to the functionality shown—the various modules and engines shown in the gaming platform 110 are exemplary and not meant to be limiting.

In this embodiment, the gaming platform 110 may incorporate the functionality of the module block 130 directly within the gaming platform 110. In particular, the augmented digital exemplary system 154 shown may incorporate the various features of the module block 130 of the computer system 120 described in FIG. 1. Thus, the present invention as shown in FIG. 1 contemplates a third party computer system 120 connecting to the gaming platform 110 to provide the augmented digital exemplars and augmented digital environments, styles and the like provided herein. Alternatively or additionally, as shown in FIG. 2, the present invention contemplates a gaming platform 110 incorporating the ability to directly augment digital exemplars and provide augmented digital realities, styles and the like. Thus, the methods, processes and systems of the present invention described herein may be applicable to a third party system that is connectable to game platform to enhance or alter its functionality, or may be applicable to create an improved game platform directly.

Figure 3:
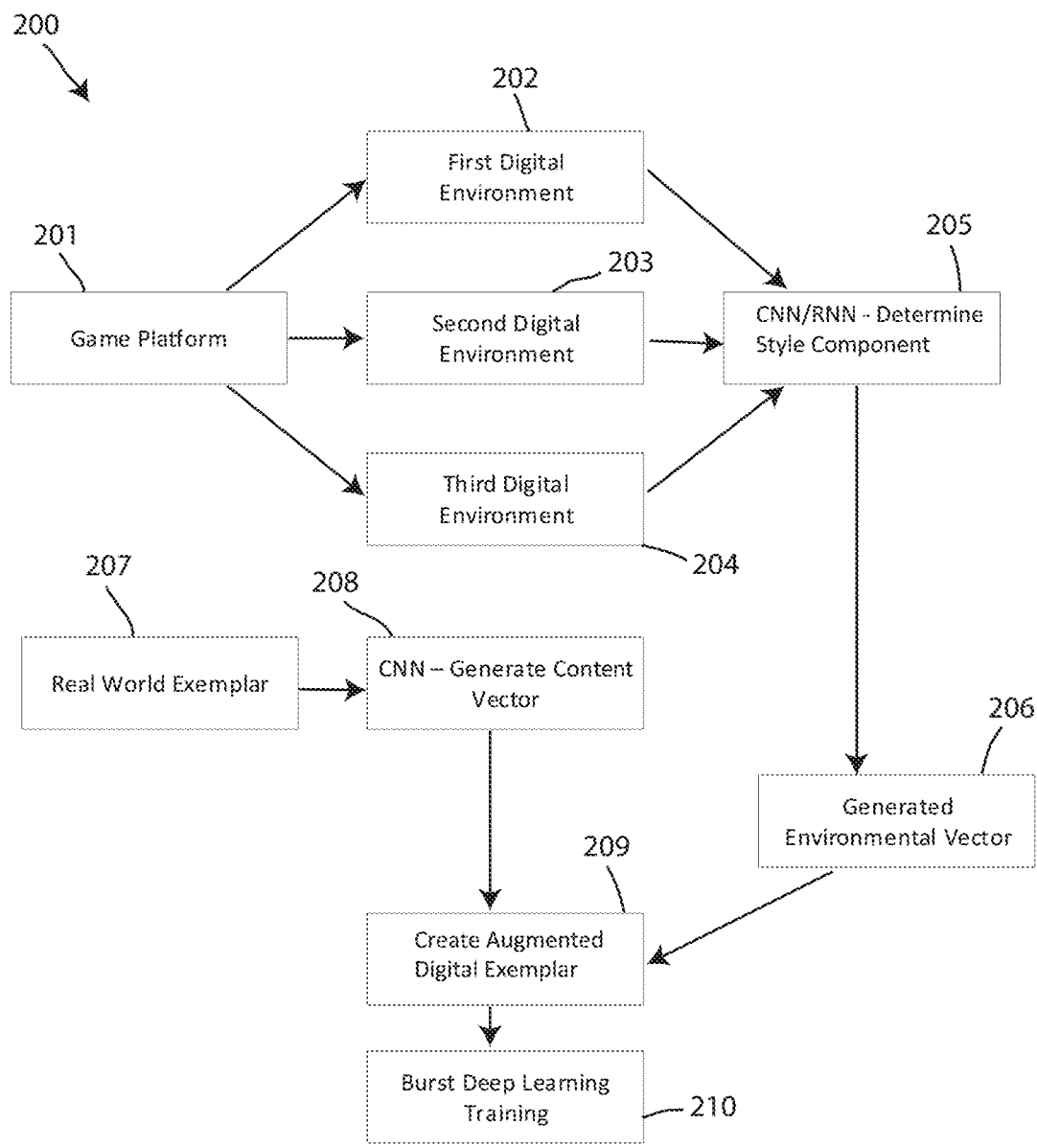
FIG. 3 depicts a process flow for generating an augmented digital exemplar with deep learning, in accordance with embodiments of the present invention.

FIG. 3 depicts a process flow 200 for generating an augmented digital exemplar with deep learning, in accordance with embodiments of the present invention. The process flow 200 includes a game platform 201 that is configured to provide various digital environments within a digital or virtual world. For example, the game platform 201 may be configured to provide or render a first digital environment 202, a second digital environment 203 and a third digital environment 204 within a game world. These digital environments 202, 203, 204 may be communicated to, for example, the communication module 131 of the module block 130 as described above. From these digital environments, a CNN and/or RNN 205 may be configured to generate a style component or vector 206, by for example the RNN and/or CNN module 133. Simultaneously, data related to a real world exemplar 207 may be provided to another CNN and/or RNN 207, which may generate a content vector 208 related to the real world exemplar 207, by for example the RNN and/or CNN module 133. The generated content vector 208 and the generated environmental vector 206 may be provided to create an augmented digital exemplar 209, by for example the morphing module 134. The augmented digital exemplar 209 may be utilized to create burst deep learning training 210, by for example the burst learning module 135.

Figure 4:
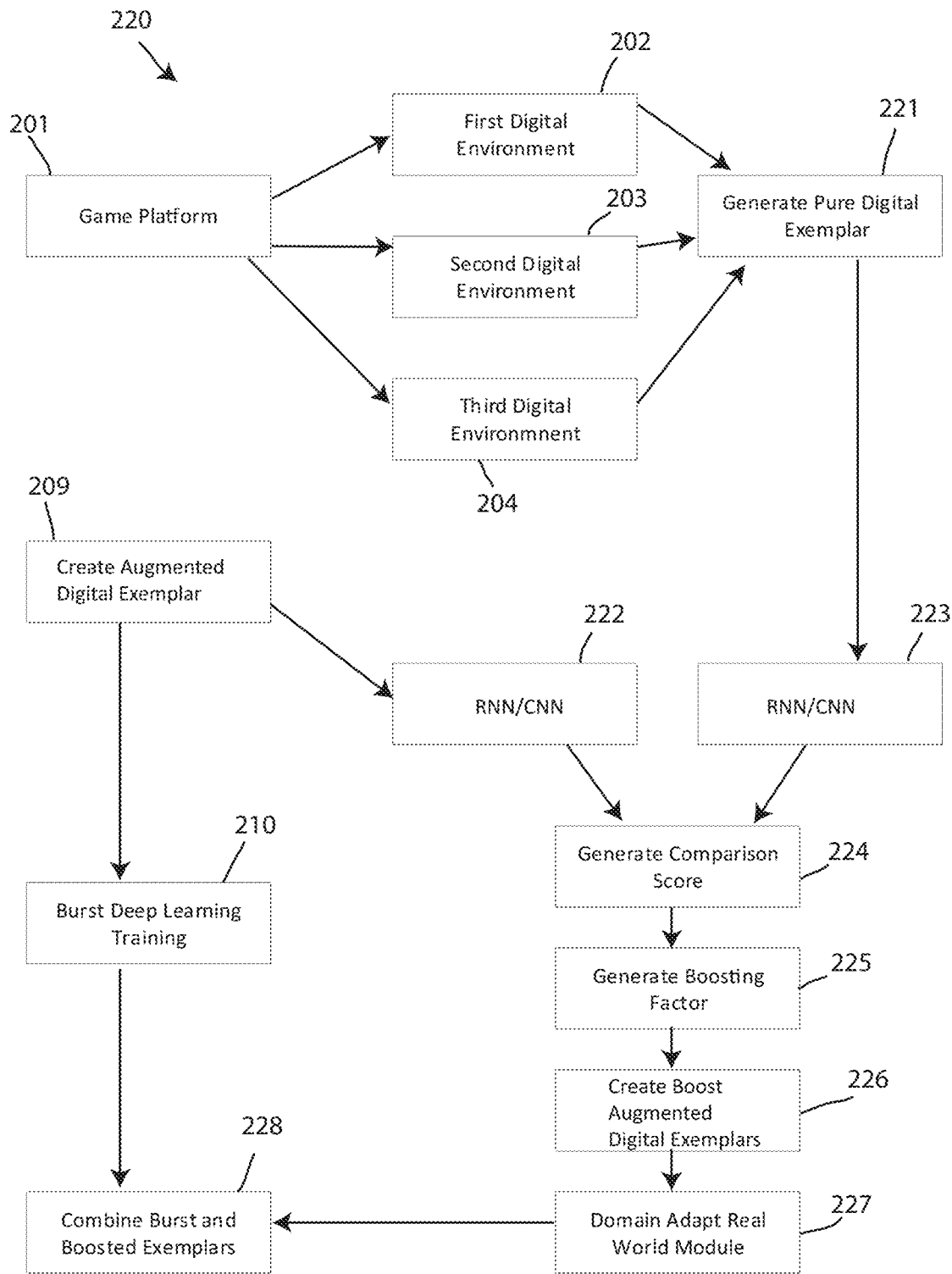
FIG. 4 depicts a process flow for optimizing back propagation, in accordance with embodiments of the present invention.

FIG. 4 depicts a process flow 220 for optimizing back propagation, in accordance with embodiments of the present invention. The process flow 220 may be an extension of the process flow 200, or may be a completely separate process flow. Like the process flow 200, the process flow 220 includes the game platform 201 that is configured to provide various digital environments within a digital or virtual world, including the first digital environment 202, the second digital environment 203 and the third digital environment 204. These digital environments 202, 203, 204 may be communicated to, for example, the communication module 131 of the module block 130 as described above. From these digital environments, a CNN and/or RNN 205 may be configured to generate a pure digital exemplar 221 related to a non-augmented digital environment. The purely digital exemplar 221 may be analyzed by an RNN and/or CNN such that the purely digital exemplars encodings and/or vectors are recognized and/or created. As described above, the process flow 200 may create an augmented digital exemplar 209. The augmented digital exemplar 209 may further be provided, in the form of an image thereof, for example, to an RNN and/or CNN such that encodings and/or vectors related to the augmented digital exemplar 209 are recognized and/or created. A comparison score 224 may be generated between related to the log of the Cartesian distances between the real world exemplar encodings and/or vector, the purely digital exemplar encodings and/or vector, and the augmented digital exemplar encodings and/or vector. The comparison score 224 may be used to create a boost factor 225. From the boost factor 225, boosted augmented digital exemplars 226 may be created. These may be provided to a domain adapt real world module 227. The domain adapt real world module 227 may be configured for rendering the boosted augmented digital exemplars 226 within a digital or virtual environment within the game or game platform. A final step 228 of combining burst and boosted exemplars may be included to fully render a digital or virtual environment with all of the augmented exemplars created by the system 100.

Figure 5:
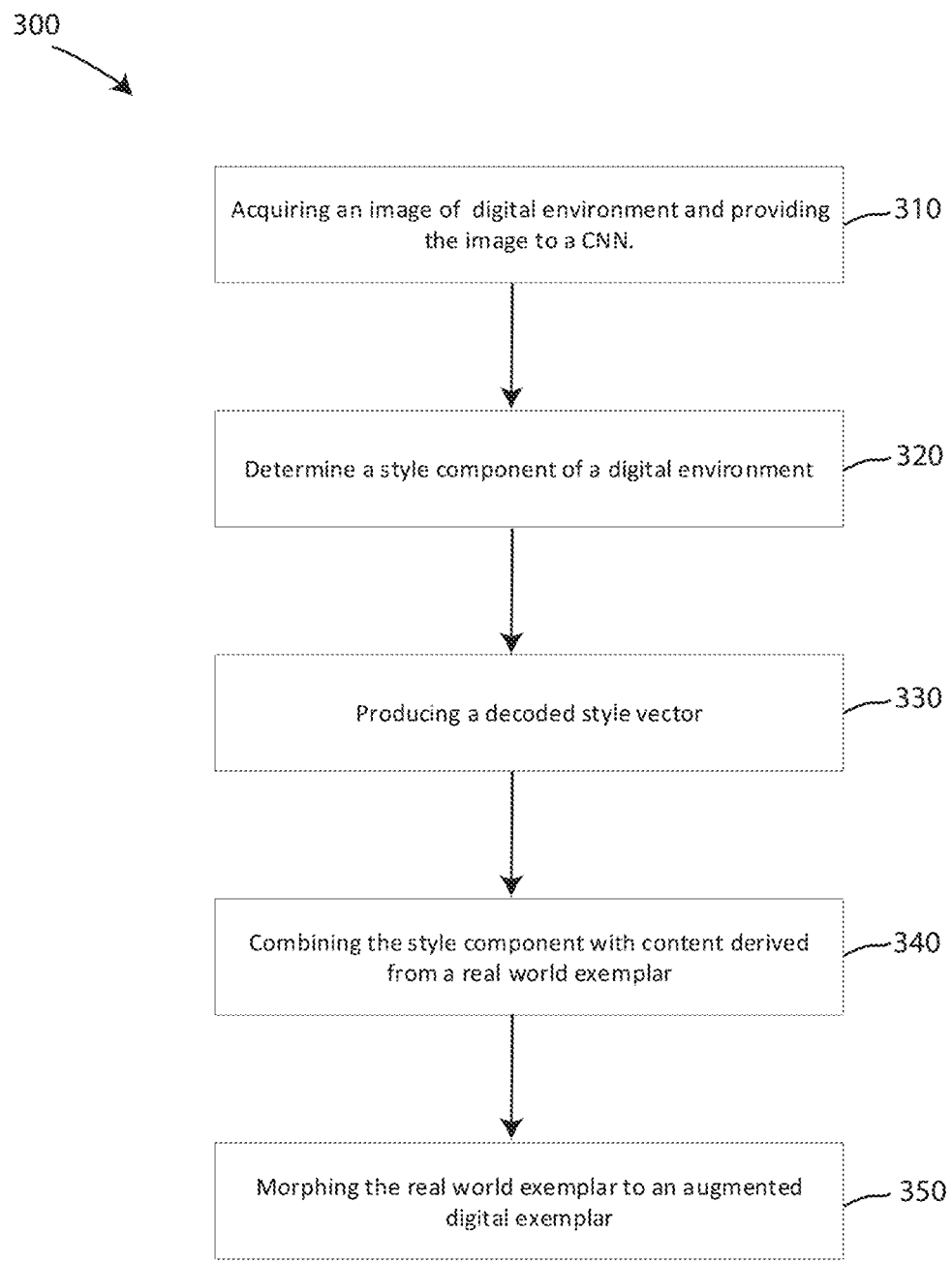
FIG. 5 depicts a flow chart of a method for deep learning from real world and digital exemplars, in accordance with embodiments of the present invention.

FIG. 5 depicts a flow chart of a method 300 for deep learning from real world and digital exemplars, in accordance with embodiments of the present invention. The method 300 may include a step 310 of acquiring, by a frame grabber of one or more processors of a computer system, such as the computer system 120, an image of a digital environment and providing the imaging to a convolution neural network. The method 300 may include a step 320 of determining, by one or more processors of a computer system, a style component of a digital environment of a game platform, such as the game platforms 110. The determining may, for example, be accomplished based at least in part on a teleportation, travel or the like, between the digital environment and a second digital environment by a user interacting on the game platform. The method 300 may include a step 330 of producing, by the one or more processors of the computer system during the determining, a decoded style vector. The method may include a step 340 of combining, by the one or more processors of the computer system, the style component with content derived from a real world exemplar. The method may include a step 350 of morphing, by one or more processors of a computer system, the real world exemplar to an augmented digital exemplar of the game platform.

Figure 6:
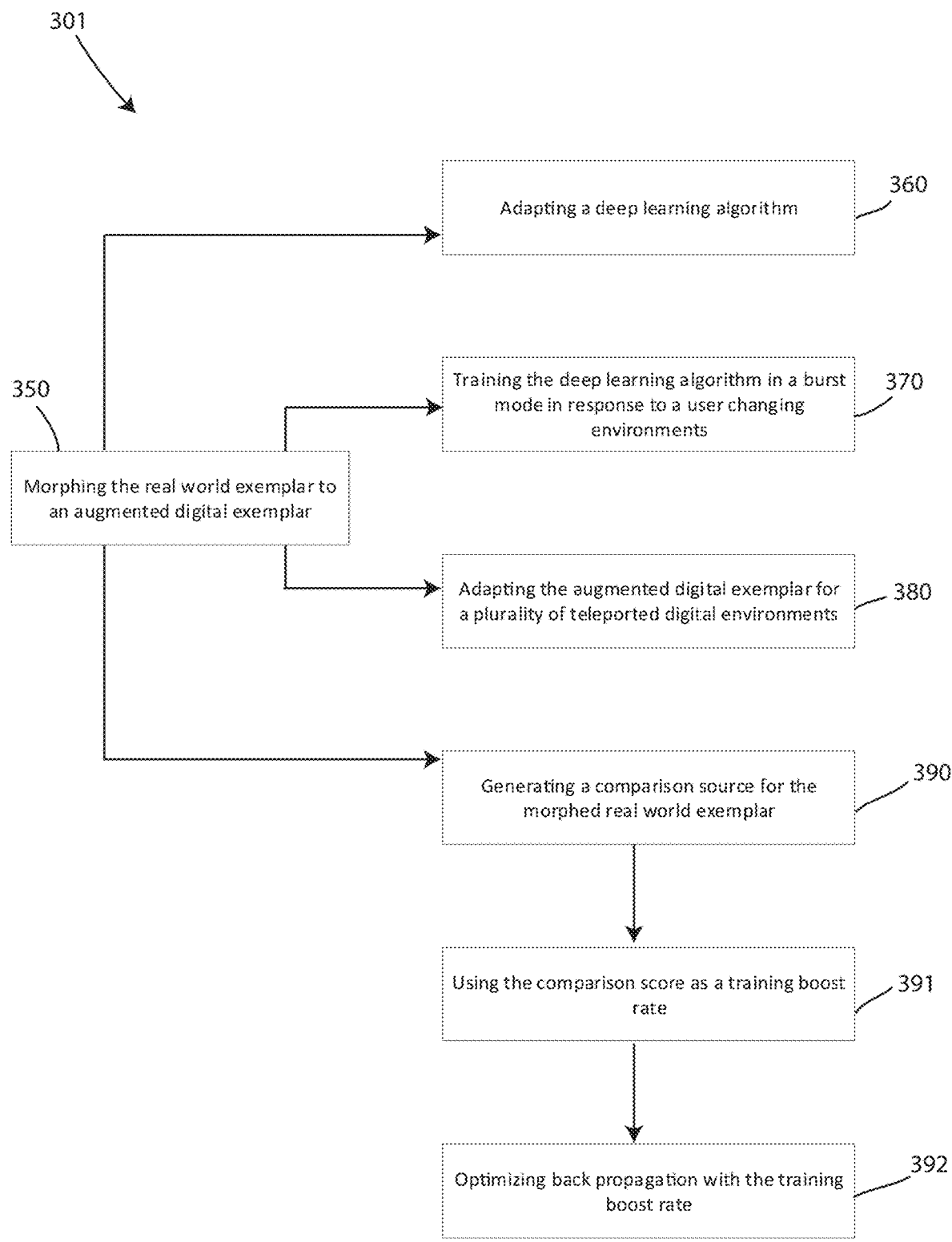
FIG. 6 depicts a flow chart of another method for deep learning from real world and digital exemplars, in accordance with embodiments of the present invention.

FIG. 6 depicts a flow chart of another method 301 for deep learning from real world and digital exemplars, in accordance with embodiments of the present invention. The method 301 may be a continuation of the method 300. The method 301 may include four methods which may be subsequent to the morphing step 350. In particular, the method 301 may include a step 360 of adapting, by the one or more processors of the computer system, at least one deep learning algorithm to accomplish at least one of the determining, combining and morphing. The method 301 may include a step 370 of training, by the one or more processors of the computer system, the at least one deep learning algorithm in a burst mode in response to a user changing from the digital environment to a second digital environment within the game platform. The method 301 may include a step 370 of adapting, by the one or more processors of the computer system, the augmented digital exemplar for a plurality of different teleported digital environments including the digital environment.

Still further, the method 301 may include a step 390 of generating, by the one or more processors of the computer system, a comparison score for the morphed real world exemplar compared with the real world exemplar and at least one pure digital exemplar. The method 301 may include a step 391 of using, by the one or more processors of the computer system, the comparison score as a training boosted rate. The method 301 may include a step 392 of optimizing, by the one or more processors of the computer system, back propagation with the training boosted rate. The method 301 may still further include combining, by the one or more processors of the computer system, a burst model generated from the augmented digital exemplar with a boosted burst model generated from the training bursted rate to create a combined adaptable model.

Figure 7:
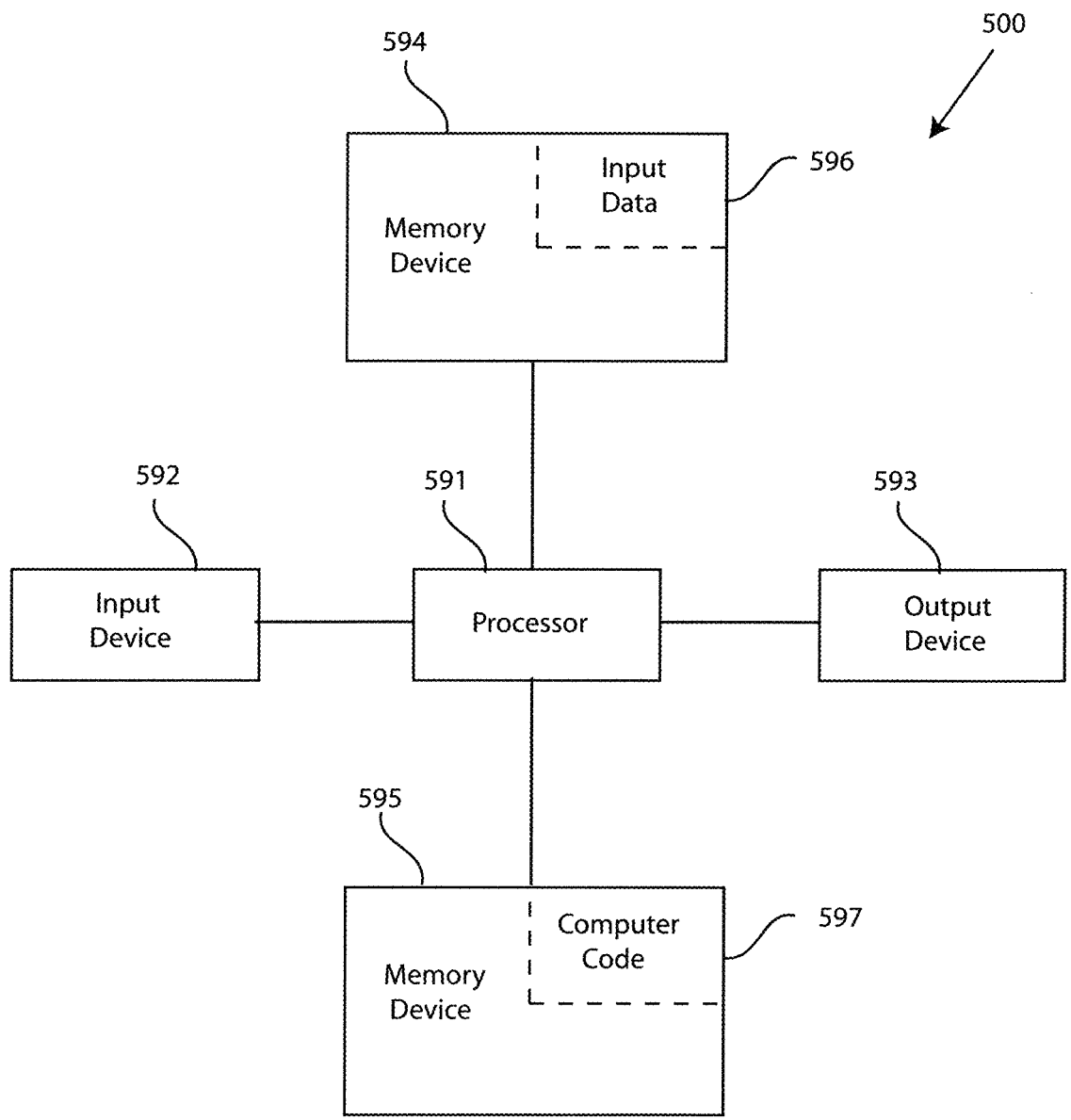
FIG. 7 depicts a block diagram of a computer system for the systems for deep learning from real world and digital exemplars of FIGS. 1-2, capable of implementing the methods and processes of FIGS. 3-6, in accordance with embodiments of the present invention.

FIG. 7 illustrates a block diagram of a computer system that may representative of any computer or computer system within the systems for deep learning from real world and digital exemplars of FIGS. 1-2, capable of implementing the processes and methods of FIGS. 3-6, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing methods and processes in the manner prescribed by the embodiments of FIGS. 3-6 using the systems for deep learning from real world and digital exemplars of FIGS. 1-2, wherein the instructions of the computer code 597 may be executed by processor 591 via memory device 595. The computer code 597 may include software or program instructions that may implement one or more algorithms for implementing the methods of deep learning from real world and digital exemplars, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as computer code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for deep learning from real world and digital exemplars. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for deep learning from real world and digital exemplars. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for deep learning from real world and digital exemplars. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for deep learning from real world and digital exemplars.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
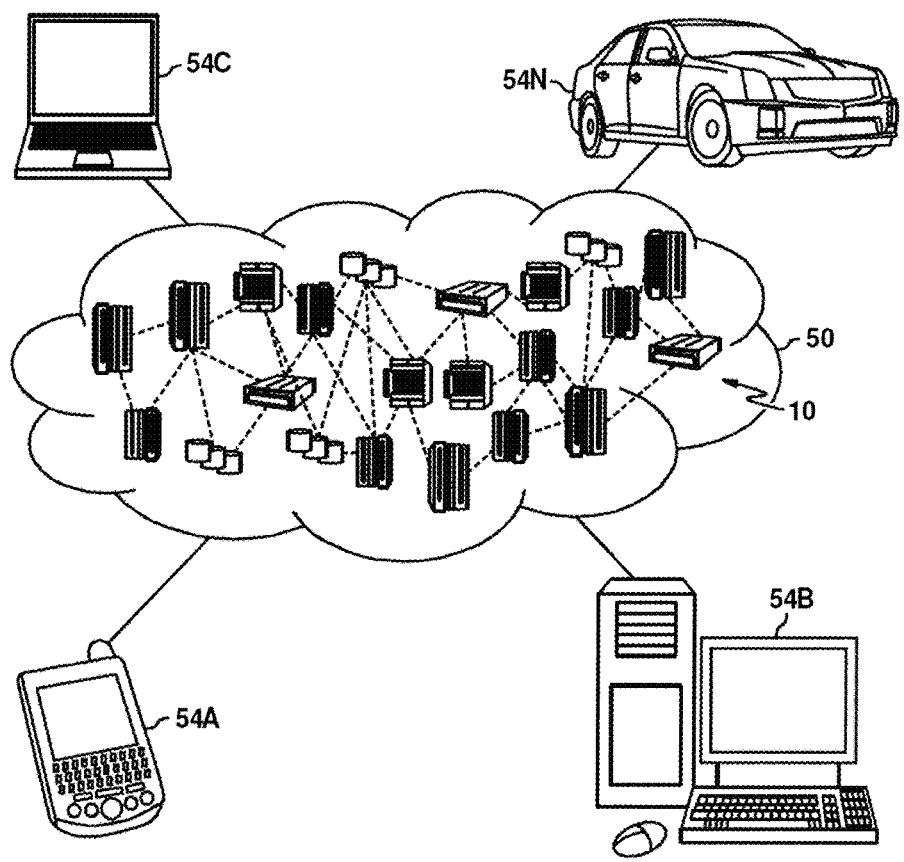
FIG. 8 depicts a cloud computing environment, in accordance with embodiments of the present invention.
Figure 9:
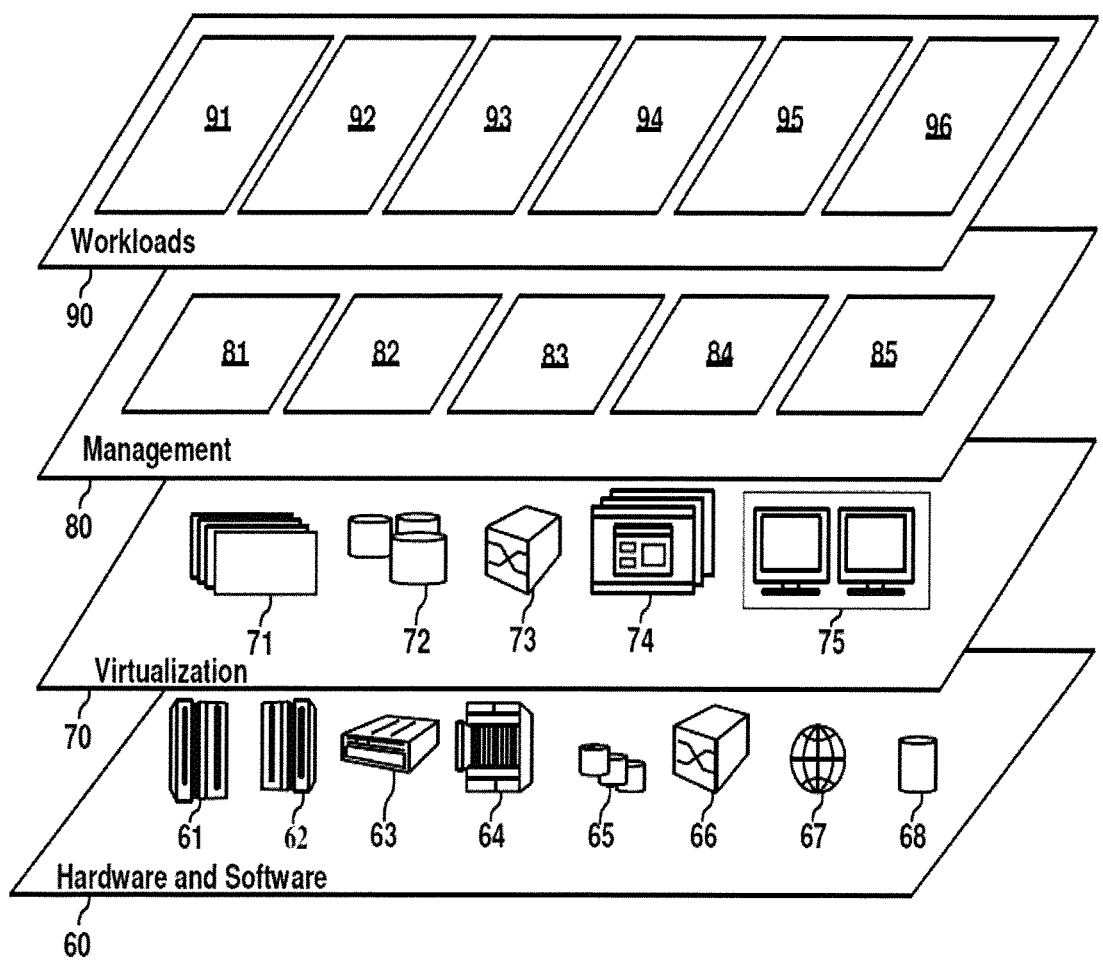
FIG. 9 depicts abstraction model layers, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61, RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing deep learning from real world and digital exemplars 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, the method comprising:
  determining, by one or more processors of a computer system, a style component of a digital environment of a game platform;
  combining, by the one or more processors of the computer system, the style component with content derived from a real world exemplar;
  morphing, by one or more processors of a computer system, the real world exemplar to an augmented digital exemplar of the game platform;
  adapting, by the one or more processors of the computer system, at least one deep learning algorithm to accomplish at least one of the determining, combining and morphing;
  using, by the one or more processors of the computer system, the augmented digital exemplar of the game platform to create burst deep learning training; and
  producing, by the one or more processors of the computer system, an increased number of instances of the augmented digital exemplar in a burst mode using the burst deep learning training.

2. The method of claim 1, further comprising:
  generating, by the one or more processors of the computer system, a comparison score for the morphed real world exemplar compared with the real world exemplar and at least one pure digital exemplar;
  using, by the one or more processors of the computer system, the comparison score as a training boosted rate; and
  optimizing, by the one or more processors of the computer system, back propagation with the training boosted rate.

3. The method of claim 1, further comprising:
  training, by the one or more processors of the computer system, the at least one deep learning algorithm in a burst mode in response to a user changing from the digital environment to a second digital environment within the game platform.

4. The method of claim 1, wherein the determining is accomplished based at least in part on teleportation between the digital environment and a second digital environment by a user interacting on the game platform.

5. The method of claim 1, further comprising:
  adapting, by the one or more processors of the computer system, the augmented digital exemplar for a plurality of different teleported digital environments including the digital environment.

6. The method of claim 4, further comprising:
  acquiring, by a frame grabber of the one or more processors of the computer system, an image of the digital environment and providing the imaging to a convolution neural network prior to the determining; and
  producing, by the one or more processors of the computer system during the determining, a decoded style vector.

7. The method of claim 2, further comprising:
  combining, by the one or more processors of the computer system, a burst model generated from the augmented digital exemplar with a boosted burst model generated from the training bursted rate to create a combined adaptable model.

8. A computer system, comprising:
  one or more processors;
  one or more memory devices coupled to the one or more processors; and
  one or more computer readable storage devices coupled to the one or more processors, wherein the one or more storage devices contain program code executable by the one or more processors via the one or more memory devices to implement a method of deep learning from real world and digital exemplars, the method comprising:

determining, by the one or more processors of the computer system, a style component of a digital environment of a game platform;

combining, by the one or more processors of the computer system, the style component with content derived from a real world exemplar;

morphing, by one or more processors of a computer system, the real world exemplar to an augmented digital exemplar of the game platform;

adapting, by the one or more processors of the computer system, at least one deep learning algorithm to accomplish at least one of the determining, combining and morphing;

using, by the one or more processors of the computer system, the augmented digital exemplar of the game platform to create burst deep learning training; and producing, by the one or more processors of the computer system, an increased number of instances of the augmented digital exemplar in a burst mode using the burst deep learning training.

9. The computer system of claim 8, the method further comprising:

generating, by the one or more processors of the computer system, a comparison score for the morphed real world exemplar compared with the real world exemplar and at least one pure digital exemplar;

using, by the one or more processors of the computer system, the comparison score as a training boosted rate; and optimizing, by the one or more processors of the computer system, back propagation with the training boosted rate.

10. The computer system of claim 8, the method further comprising:

training, by the one or more processors of the computer system, the at least one deep learning algorithm in a burst mode in response to a user changing from the digital environment to a second digital environment within the game platform.

11. The computer system of claim 8, wherein the determining is accomplished based at least in part on teleportation between the digital environment and a second digital environment by a user interacting on the game platform.

12. The computer system of claim 8, the method further comprising:

adapting, by the one or more processors of the computer system, the augmented digital exemplar for a plurality of different teleported digital environments including the digital environment.

13. The computer system of claim 12, the method further comprising:

acquiring, by a frame grabber of the one or more processors of the computer system, an image of the digital environment and providing the imaging to a convolution neural network prior to the determining; and producing, by the one or more processors of the computer system during the determining, a decoded style vector.

14. The computer system of claim 8, the method further comprising:

combining, by the one or more processors of the computer system, a burst model generated from the augmented digital exemplar with a boosted burst model generated from the training bursted rate to create a combined adaptable model.

15. A computer program product, comprising a computer readable hardware storage device storing a computer readable program code, the computer readable program code comprising an algorithm that when executed by one or more processors of a computer system implements a method of deep learning from real world and digital exemplars, the method comprising:

determining, by the one or more processors of the computer system, a style component of a digital environment of a game platform;

combining, by the one or more processors of the computer system, the style component with content derived from a real world exemplar;

morphing, by one or more processors of a computer system, the real world exemplar to an augmented digital exemplar of the game platform; and adapting, by the one or more processors of the computer system, at least one deep learning algorithm to accomplish at least one of the determining, combining and morphing;

using, by the one or more processors of the computer system, the augmented digital exemplar of the game platform to create burst deep learning training; and producing, by the one or more processors of the computer system, an increased number of instances of the augmented digital exemplar in a burst mode using the burst deep learning training.

16. The computer program product of claim 15, the method further comprising:

generating, by the one or more processors of the computer system, a comparison score for the morphed real world exemplar compared with the real world exemplar and at least one pure digital exemplar;

using, by the one or more processors of the computer system, the comparison score as a training boosted rate; and optimizing, by the one or more processors of the computer system, back propagation with the training boosted rate.

17. The computer program product of claim 15, the method further comprising:

training, by the one or more processors of the computer system, the at least one deep learning algorithm in a burst mode in response to a user changing from the digital environment to a second digital environment within the game platform.

18. The computer program product of claim 15, wherein the determining is accomplished based at least in part on teleportation between the digital environment and a second digital environment by a user interacting on the game platform.

19. The computer program product of claim 15, the method further comprising:

adapting, by the one or more processors of the computer system, the augmented digital exemplar for a plurality of different teleported digital environments including the digital environment.

20. The computer program product of claim 19, the method further comprising:

acquiring, by a frame grabber of the one or more processors of the computer system, an image of the digital environment and providing the imaging to a convolution neural network prior to the determining; and producing, by the one or more processors of the computer system during the determining, a decoded style vector.

\* \* \* \* \*